US008754979B2

(12) United States Patent
Tomita

(10) Patent No.: US 8,754,979 B2
(45) Date of Patent: Jun. 17, 2014

(54) FOCUS ADJUSTMENT DEVICE AND IMAGING DEVICE

(75) Inventor: Hiroyuki Tomita, Yokohama (JP)

(73) Assignee: Nikon Corporation, Tokyo (JP)

( * ) Notice: Subject to any disclaimer, the term of this patent is extended or adjusted under 35 U.S.C. 154(b) by 311 days.

(21) Appl. No.: 13/189,859

(22) Filed: Jul. 25, 2011

(65) Prior Publication Data

US 2012/0026386 A1 Feb. 2, 2012

(30) Foreign Application Priority Data

Jul. 30, 2010 (JP) ................................ 2010-171457

(51) Int. Cl.
H04N 5/232 (2006.01)
(52) U.S. Cl.
USPC .......................................... 348/353; 348/356
(58) Field of Classification Search
USPC ........... 348/345, 349, 350, 353, 354, 356, 79, 348/80
See application file for complete search history.

(56) References Cited

U.S. PATENT DOCUMENTS

| 2006/0232699 | A1* | 10/2006 | Suto et al. ...................... 348/345 |
| 2008/0025717 | A1 | 1/2008 | Kawanishi |
| 2011/0261251 | A1 | 10/2011 | Okamoto et al. |

FOREIGN PATENT DOCUMENTS

| EP | 1 713 260 A2 | 10/2006 |
| JP | A-7-135596 | 5/1995 |
| JP | A-9-9132 | 1/1997 |
| JP | A-9-23366 | 1/1997 |
| JP | A-11-69225 | 3/1999 |
| JP | A-2001-141982 | 5/2001 |
| JP | A-2006-64970 | 3/2006 |
| JP | A-2008-249966 | 10/2008 |
| WO | WO 2010/050200 A1 | 5/2010 |

OTHER PUBLICATIONS

Partial European Search Report issued in European Application No. 11175937.9 on Nov. 25, 2011.

* cited by examiner

*Primary Examiner* — Tuan Ho
(74) *Attorney, Agent, or Firm* — Oliff PLC

(57) ABSTRACT

The focus adjustment device is characterized by comprising: a driver 231 that drives a focus adjustment optical system 213 to change a focus status; a focus detector 170 that detects evaluation values with respect to contrast of images to perform focus detection for a optical system; an obtaining unit 170 that obtains a maximum driving speed among speeds with which the focus adjustment optical system is able to be driven; and a controller 170 that causes the driver to perform a first driving operation in which the focus adjustment optical system is driven within a certain range and with a certain speed or to perform a second driving operation which is different from the first driving operation, wherein the controller compares the maximum driving speed and a first driving speed as a driving speed for the focus adjustment optical system during the first driving operation with each other when a peak of the evaluation values fails to be detected within the certain range as a result of performing the first driving operation, and determines based on obtained comparison result whether or not to cause the driver to perform the second driving operation subsequently to the first driving operation.

11 Claims, 9 Drawing Sheets

FOCUS ADJUSTMENT DEVICE AND IMAGING DEVICE

BACKGROUND OF THE INVENTION

1. Field of the Invention

The present invention relates to a focus adjustment device and an imaging device.

2. Description of the Related Art

A focus adjustment device is heretofore known in which focus evaluation values regarding contrast of images by an optical system are obtained while search driving a focus lens thereby to detect focus statuses of the optical system. For example, Patent Document 1 (unexamined Japanese Patent Publication No. 2008-249966) suggests a technique in which the manner of search driving for the focus lens is varied at the time of obtaining the focus evaluation values depending on the focal distance of the optical system. More specifically, in the Patent Document 1, when the focal distance of the optical system is relatively large, a focus adjustable range of the optical system is determined as being also relatively wide, and it is attempted to reduce the required time for search driving by performing a first search driving in which the search driving is performed with a focus adjustable speed and then performing a second search driving of which the search speed is larger than that of the first search driving. On the other hand, when the focal distance of the optical system is relatively small, the focus adjustable range of the optical system is determined as being also relatively narrow, and a configuration is employed such that only the first search driving is performed in which the search driving is performed with the focus adjustable speed, because in this case the second search driving with the faster search speed is not necessary to be performed.

SUMMARY OF THE INVENTION

In the above Patent Document 1, however, because the focus adjustable range of the optical system is determined from the focal distance of the optical system, and based on this, the manner of search driving for the focus lens is determined, the following problems may occur in some cases. That is, in certain kinds of lens barrels to be used, the focus adjustable range may be relatively narrow even if the focal distance of the optical system is relatively large in some cases, and in such cases, according to the Patent Document 1, the focus adjustable range of the optical system would be determined to be relatively wide because of the focal distance of the optical system being relatively large, and therefore, the second search driving is to be performed, which will be followed by a third search driving for performing a further search driving with a focus detectable speed, thereby to result in a required long time for search driving. Moreover, in certain kinds of lens barrels to be used, the focus adjustable range may be relatively wide even if the focal distance of the optical system is relatively small in some cases, and in such cases, according to the Patent Document 1, the focus adjustable range of the optical system would be determined to be relatively narrow because of the focal distance of the optical system being relatively small, and therefore, only the first search driving is to be performed for search driving with a focus detectable speed, thereby to result in a required long time for search driving.

Problems to be solved by the present invention include providing a focus adjustment device in which the focus detection for the optical system is enabled to be efficient and the time required for the focus detection is also enabled to be reduced.

The present invention solves the above problems by the following solutions. Note that, although the description in the following some paragraphs is associated with reference numerals which correspond to those in the drawings illustrating embodiments of the invention, these reference numerals are intended only to facilitate understanding of the invention and are not intended to limit the invention.

The focus adjustment device according to the present invention is characterized by comprising: a driver (231) that drives a focus adjustment optical system (213) to change a focus status of an optical system; a focus detector (170) that detects evaluation values with respect to contrast of images by the optical system in a plurality of different focus statuses to perform focus detection for the optical system; an obtaining unit (170) that obtains a maximum driving speed among speeds with which the focus adjustment optical system is able to be driven; and a controller (170) that causes the driver to perform a first driving operation in which the focus adjustment optical system is driven within a certain range and with a certain speed or to perform a second driving operation which is different from the first driving operation, wherein the controller compares the maximum driving speed and a first driving speed as a driving speed for the focus adjustment optical system during the first driving operation with each other when a peak of the evaluation values fails to be detected within the certain range as a result of performing the first driving operation, and determines based on obtained comparison result whether or not to cause the driver to perform the second driving operation subsequently to the first driving operation.

In the invention involving the above focus adjustment device, the controller (170) may be configured to cause the driver to perform the second driving operation subsequently to the first driving operation when a peak of the evaluation values fails to be detected within the certain range as a result of performing the first driving operation and when the maximum driving speed and the first driving speed satisfy a relationship: (the maximum driving speed)·k1 ≥ (the first driving speed), wherein (0<k1≤1).

In the invention involving the above focus adjustment device, the apparatus may be configured such that the first driving operation and the second driving operation are different from each other in a driving speed for the focus adjustment optical system (213) and in a driving range for the focus adjustment optical system.

In the invention involving the above focus adjustment device, the apparatus may be configured such that a second driving speed as a driving speed for the focus adjustment optical system (213) during the second driving operation is a speed faster than the first driving speed during the first driving operation.

In the invention involving the above focus adjustment device, the controller (170) may be configured to cause the driver (231) to perform the first driving operation after extending a driving range when having determined not to cause the second driving operation to be performed.

In the invention involving the above focus adjustment device, the controller (170) may be configured to cause the driver (231) to perform a third driving operation different from the second driving operation subsequently to the second driving operation when having determined to cause the second driving operation to be performed.

The focus adjustment device according to the present invention is characterized by comprising: a driver (231) that drives a focus adjustment optical system (213) to change a focus status of an optical system; a focus detector (170) that detects evaluation values with respect to contrast of images by the optical system in a plurality of different focus statuses to perform focus detection for the optical system; a controller (170) that instructs the driver to change a driving speed for the focus adjustment optical system (213) to a faster speed than a present driving speed when the focus detector fails to detect a peak of the evaluation values within a certain range; and a determining unit (170) that compares, when the controller provides an instruction to change the driving speed for the focus adjustment optical system, a before-instruction driving speed as the driving speed for the focus adjustment optical system before the instruction to change and an after-instruction driving speed as the driving speed for the focus adjustment optical system after the instruction to change with each other to generate a comparison result, and determines based on the comparison result whether or not the after-instruction driving speed is a speed with which a focus position is detectable.

In the invention involving the above focus adjustment device, the determining unit (170) may be configured to determine that the after-instruction driving speed is a speed with which the focus position is not detectable when the before-instruction driving speed and the after-instruction driving speed satisfy a relationship: (the after-instruction driving speed)≥(the before-instruction driving speed)·k2, wherein (k2≥1).

In the invention involving the above focus adjustment device, the controller (170) may be configured to instruct the driver (231) to change the driving speed for the focus adjustment optical system (213) to a speed with which the focus position is detectable after causing the focus detection for the optical system to be performed with the after-instruction driving speed when the after-instruction driving speed is determined to be a speed with which the focus position is not detectable.

The imaging device according to the present invention is characterized by comprising the above focus adjustment device.

The imaging device according to the present invention is characterized by comprising: the above focus adjustment device; and a lens barrel (200) having the focus adjustment optical system (231), wherein the obtaining unit (170) obtains the maximum driving speed from the lens barrel.

According to the present invention, the focus detection for the optical system is enabled to be efficient, and the time required for the focus detection is also enabled to be reduced.

DESCRIPTION OF THE PREFERRED EMBODIMENTS

First Embodiment

Figure 1:
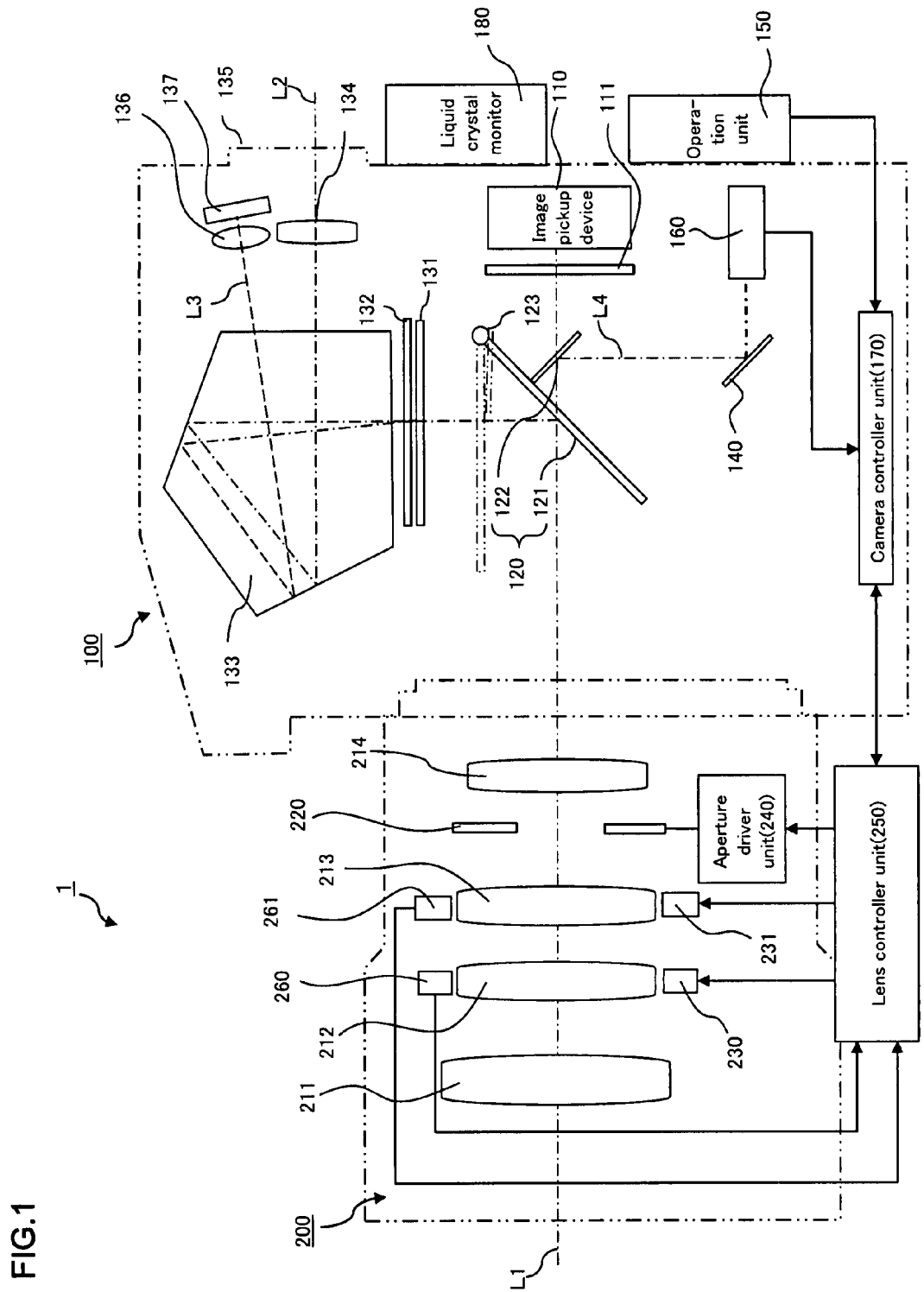
FIG. 1 is a block diagram illustrating a camera1 according to a first embodiment.

Hereinafter, the first embodiment according to the present invention will be described with reference to the drawings. FIG. 1 is a block diagram illustrating a camera 1 according to the first embodiment, in which illustrations and descriptions regarding general configurations of cameras are partly omitted except for the configurations relevant to the imaging device according to the present invention.

The camera 1 according to the present embodiment is comprised of a camera body 100 and a lens barrel 200, as shown in FIG. 1.

The lens barrel 200 is provided therein with a shooting optical system including lenses 211, 212, 213 and 214 and an aperture 220.

The focus lens 213 is provided to be capable of being driven along the optical axis L1 of the lens barrel 200, and the position thereof is adjusted by a focus lens driving motor 231 while being detected by an encoder 261 for focus lens.

Specific structure of a driving mechanism for this focus lens 213 along the optical axis L1 is not particularly limited. For one example, a rotatable barrel having formed with a helicoidal groove (screw-shaped groove) on the inner surface thereof is rotatably inserted into a fixed barrel fixed to the lens barrel 200, and a lens frame having been fixed thereon with the focus lens 213 is provided such that end portions of the lens frame are engaged in the helicoidal groove. By using the focus lens driving motor 231 to cause the rotatable barrel to rotate, the focus lens 213 fixed to the lens frame will be driven straightforward along the optical axis L1. Note that, although the lenses 211, 212, and 214 are provided in the lens barrel 200 in addition to the focus lens 213, the present embodiment will be described with reference to the focus lens 213 as an example hereinafter.

While the focus lens 213 fixed to the lens frame is driven straightforward along the optical axis L1 by rotating the rotatable barrel relative to the lens barrel 200, as described above, the focus lens driving motor 231 as a driving source thereof is provided in the lens barrel 200. The focus lens driving motor 231 and the rotatable barrel are mechanically coupled with each other through a transmission system comprised of a plurality of gears having a predetermined gear ratio, and if the driving shaft of the focus lens driving motor 231 is driven to rotate in either one direction, then the driving force is transmitted via the predetermined gear ratio to drive the rotatable barrel in a certain direction, thereby driving the focus lens 213 fixed to the lens frame straightforward along the optical axis L1 in either one direction. In contrast, if the drive shaft of the focus lens driving motor 231 is driven to rotate in the opposite direction, then gears of the transmission system also rotate in opposite directions, and the focus lens 213 will thus be driven straightforward in the opposite direction along the optical axis L1.

The position of the focus lens 213 is detected by the encoder 261 for focus lens. As previously described, the position of the focus lens 213 in the direction of the optical axis L1 is correlative to the rotating angle of the rotatable barrel, and may thus be determined by detecting a relative rotating angle of the rotatable barrel with respect to the lens barrel 200, for example.

As the encoder 261 for focus lens according to the present embodiment, various kinds of encoders are available, including one which detects the rotation of a rotating disk synchronized with the rotative driving of the rotatable barrel by means of an optical sensor, such as a photo interrupter, and outputs pulse signals depending on the rotating speed, and another one in which an encoder pattern and a brush contact to contact with the encoder pattern are used such that the encoder pattern is located on a flexible wiring board which is provided on either one of the fixed barrel and the rotatable barrel, the brush contact is provided on the other one, and the change in the contacting position is detected by a detecting circuit depending on the driving amount (in any of the rotating direction and the optical axis direction) of the rotatable barrel.

The focus lens 213 is allowed to be driven in the direction of the optical axis L1 within a range from one end at the side of the camera body 100 (also referred to as "nearest end") to the other end at the side of an object (also referred to as "infinite end") by the rotation of the above-mentioned rotatable barrel. Now, the encoder 261 detects the present position of the focus lens 213, and information relevant to the present position of the focus lens 213 is transmitted via a lens controller unit 250 to a camera controller unit 170 as will be described later. The camera controller unit 170 calculates a driving amount for the focus lens 213 on the basis of the received information regarding the position of the focus lens 213 and transmits the driving amount via the lens controller unit 250, and the focus lens driving motor 231 drives the focus lens 213 on the basis of the received driving amount.

In order to drive the focus lens 213 with a given lens driving speed, the lens controller unit 250 according to the present embodiment transmits driving pulse signals depending on the lens driving speed to the focus lens driving motor 231 in response to instructions from the camera controller unit 170. In addition, the lens controller unit 250 stores a maximum driving speed, which is the maximum speed within the range of speed capable of driving the focus lens 213, in a memory (not shown) provided in the lens controller unit 250.

The zoom lens 212 is provided movably along the optical axis L1 of the lens barrel 200, and the position thereof is adjusted by a zoom lens driving motor 230 while being detected by an encoder 260 for zoom lens. The position of the zoom lens 212 changes, for example, when the photographer rotates a zoom tube (not shown) of the lens barrel 200, and in response to this, the focal point of the optical system is to be changed. The positional information of the zoom lens 212 detected by the encoder 260 for zoom lens is transmitted to the lens controller unit 250. Note that the moving mechanism for the zoom lens 212 may be similar to that for the focus lens 213 as described above, and the similar one is available for the encoder 260 for zoom lens as the encoder 261 for focus lens also described above.

The aperture 220 is configured to have an adjustable aperture size centering around the optical axis L1 so as to limit the light amount of light flux passing through the optical system and reaching an image pickup device 110 provided in the camera body 100 and to adjust a blur amount. The adjustment for the aperture size by the aperture 220 is performed such that an appropriate aperture size calculated in an automatic exposure mode, for example, is transmitted from the camera controller unit 170 to an aperture driver unit 240 via the lens controller unit 250. In addition to this, or alternatively, an aperture size may be set by manual operation via an operation unit 150 provided on the camera body 100, thereby being input from the camera controller unit 170 to the lens controller unit 250. The aperture size of the aperture 220 is detected by an aperture size sensor not shown, and the present aperture size is recognized by the lens controller 250.

Meanwhile, the camera body 100 is provided therein with a mirror system 120 for guiding the light flux from an object to the image pickup device 110, a view finder 135, a photometric sensor 137, and a phase difference type AF detecting module 160. This mirror system 120 comprises a quick return mirror 121 adapted to pivotally move around a pivot axis 123 within a predetermined angular range between an observing position to an object and a shooting position to the object, and a sub mirror 122 pivotally provided at the quick return mirror 121 and adapted to move pivotally in synchronization with the pivotal movement of the quick return mirror 121. FIG. 1 illustrates two statuses of the mirror system 120, one for the observing position to an object indicated by solid lines and the other for the shooting position to the object indicated by two-dot chain lines.

The mirror system 120 moves pivotally between the two statuses, that is, in the observing position to an object, the mirror system 120 is positioned on the optical path of the optical axis L1, whereas in the shooting position to the object, the mirror system 120 escapes from the optical path of the optical axis L1.

The quick return mirror 121 is configured as a half mirror, which, in the status of the observation position to an object, partly reflects certain light fluxes (optical axes L2 and L3) extracted from the light flux from the object (optical axis L1) to guide respectively toward the view finder 135 and the photometric sensor 137, and transmits the residual light flux (optical axis L4) to guide toward the sub mirror 122. In contrast, the sub mirror 122 is configured as a total reflection mirror, which guides the light flux (optical axis L4) having been transmitted through the quick return mirror 121 toward the phase difference type AF detecting module 160 via a fixed mirror 140.

Accordingly, when the mirror system 120 is positioned at the observing position, the light flux from an object (optical axis L1) is guided to the view finder 135, the photometric sensor 137 and the phase difference type AF detecting module 160, thereby allowing a photographer to observe the object, and calculations for exposure and a detection for focus status of the focus lens 213 is performed. Thereafter, if the photographer fully presses a release button, then the mirror system 120 moves pivotally to the shooting position thereby to guide the whole light flux (optical axis L1) from the object toward the image pickup device 110, and the picked up image data is stored into a memory not shown.

The light flux from the object reflected by the quick return mirror 121 (optical axis L2) forms an image on a focal plane plate 131 arranged at a plane optically equivalent to the image pickup device 110, thereby being observable via a pentagonal prism 133 and an ocular lens 134. At this time, a transmissive-type liquid crystal display device 132 superimposes an indication such as a focus detecting area mark onto the image of an object projected on the focal plane plate 131, and displays relevant information for shooting, such as a shutter speed, an aperture value, and the number of shootings, on an outer area not overlapping the image of the object. This allows the photographer to observe the object and the back-ground thereof and the relevant information for the shooting or the like, through the view finder 135 in a shooting standby status.

The photometric sensor 137, which is configured as a two-dimensional color CCD image sensor or the like, divides the shooting image into a plurality of areas to output a photometric signal in response to the luminance of each divided area in order for the exposure value at the time of shooting to be calculated. Signals obtained from the photometric sensor 137 are output to the camera controller 170 thereby to be utilized for an automatic exposure control.

Incidentally, the image pickup device 110, which receives the light flux from an object, is provided in the camera body 100 so as to be located on the optical axis L1 and at a possible focal plane. The image pickup device 110 is configure as a device, such as a two-dimensional CCD image sensor, a MOS sensor, or a CID, and converts the received optical signals to image signals. The image signals output from the image pickup device 110 are transmitted to the camera controller unit 170 and converted to image data to be stored in a memory. In addition, according to the present embodiment, image signals having been output from the image pickup device 110 are transmitted to the camera controller unit 170 thereafter to be used for contrast-type focus detecting and outputting of a through image. Note that, although not shown, an infrared ray cut filter for cutting infrared ray and an optical low-pass filter for avoiding folding noises of images are disposed in front of the imaging plane of the image pickup device 110.

The phase difference type AF detecting module 160 has a mask (not shown) formed therein with a pair of openings, and a pair of line sensors (also not shown). The phase difference type AF detecting module 160 divides light flux from the optical system by the mask, and then causes the divided light fluxes to form images on the pair of line sensors. Then, the phase difference type AF detecting module 160 obtains an image shift amount between the re-formed images on the line sensors and calculates a defocus amount on the basis of the image shift amount. Thereafter, the driving amount for the focus lens 213 depending on the defocus amount is transmitted to the lens controller unit 250 via the camera controller unit 170, thereby causing the focus lens driving motor 231 to drive the focus lens 213.

The camera controller unit 170, which is comprised of a memory, CPU, and other peripheral components, obtains image signals transmitted from the image pickup device 110. In addition, the camera controller unit 170 performs the generation of the through image and the picked-up image. Moreover, according to the first embodiment, the camera controller unit 170 executes a search operation for performing a focus detecting on the basis of the image signals transmitted from the image pickup device 110. The search operation is a sequence of processes for calculating focus evaluation values at a plurality of image planes by driving the focus lens 213 with a given search speed within a focus adjustable range, thereby to detect a focus position on the basis of the calculated focus evaluation values. Furthermore, the first embodiment is such that the camera controller unit 170 obtains the maximum driving speed for the focus lens 213 from the lens controller unit 250 in this search operation as will be described later and calculates the search speed in the search operation, and the operating manner in the search operation is varied on the basis of the comparison result between the maximum driving speed of the focus lens 213 and the search speed in the search operation.

The operation unit 150 comprises, for example, a shutter release button, a mode setting switch for setting various operation modes of the camera 1, and other elements. The shutter release button includes a first switch SW1 which is turned on when the button is half-pressed and a second switch SW2 which is turned on when the button is fully pressed. In addition, the mode setting switch may be used for selectively switching Auto Focus Mode/Manual Mode. Information regarding the switches SW1 and SW2 of the shutter release button and various modes are sent to the camera controller unit 170 after being set via the operation unit 150.

Liquid crystal monitor 180 is provided on the back face of the camera body 100 to present on a display thereof the through image based on image signals obtained by the image pickup device 110.

Figure 2:
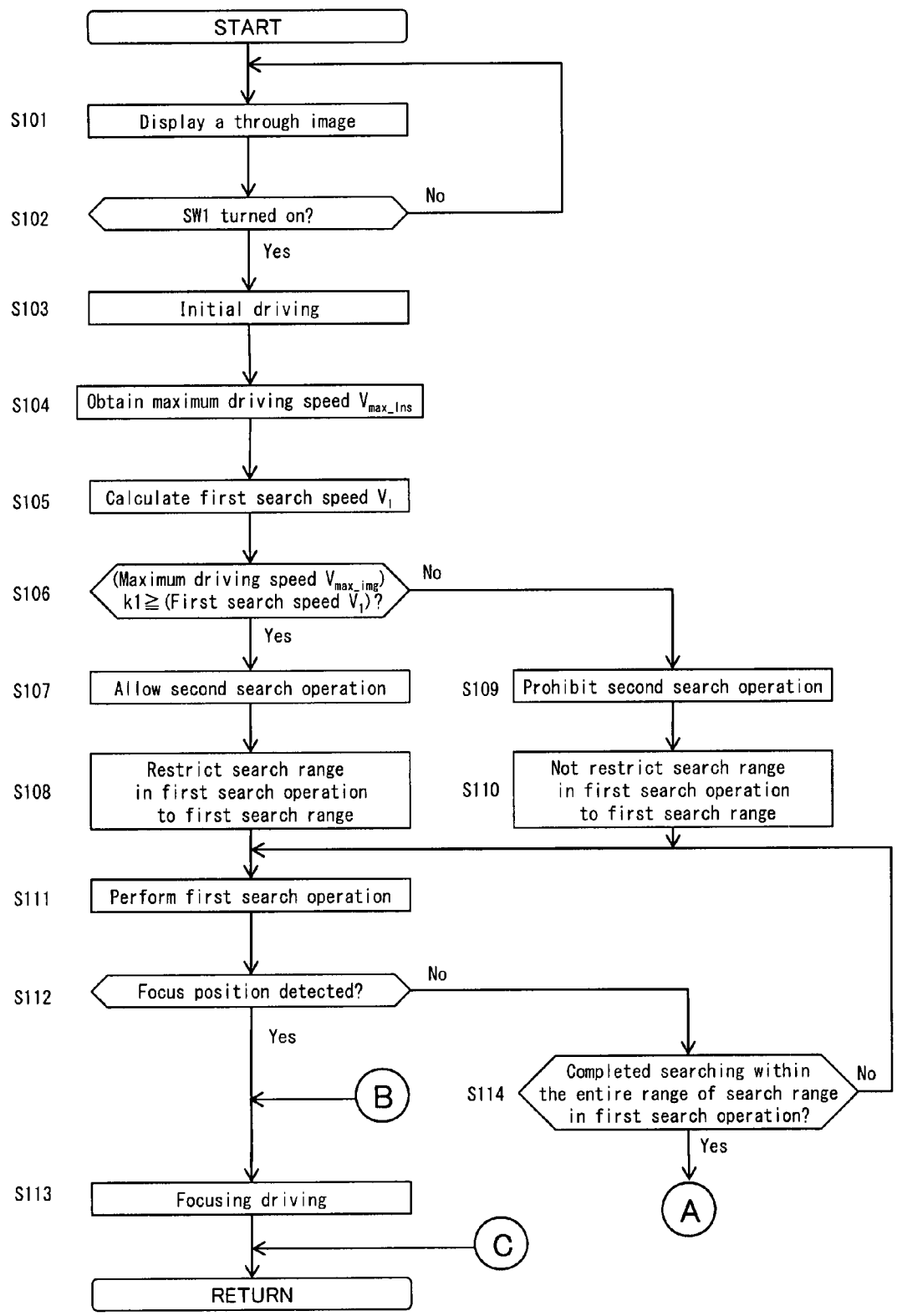
FIG. 2 is a flowchart (part 1) illustrating the operation of the camera 1 according to the first embodiment.
Figure 3:
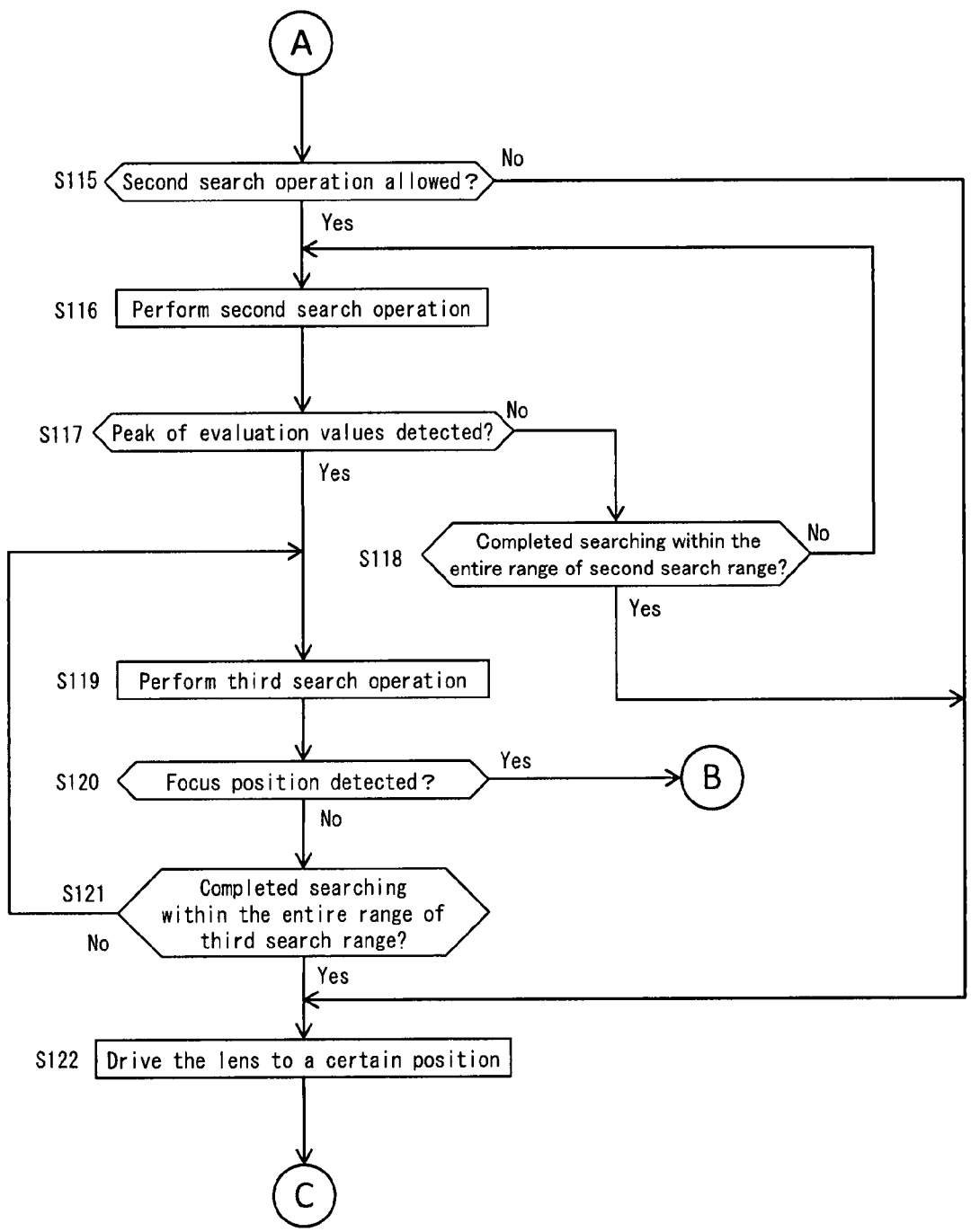
FIG. 3 is a flowchart (part 2) illustrating the operation of the camera 1 according to the first embodiment.

Hereinafter, operational examples of the camera 1 according to the present embodiment will be described with reference to FIG. 2 and FIG. 3. FIG. 2 and FIG. 3 are flowcharts illustrating the operational examples of the camera 1.

At first in step S101, the image pickup device 110 receives light flux from the shooting optical system to perform shooting for the through image displaying. Thereafter, the image signals output from the image pickup device 110 are received by the camera controller unit 170 thereby to generate the through image. The through image generated in the camera controller unit 170 is transmitted to the liquid crystal monitor 180 to be presented on the display incorporated in the liquid crystal monitor 180.

In step S102, the camera controller unit 170 determines whether or not the shutter release button has been half-pressed (the first switch SW1 has been turned on). If the first switch SW1 is determined to have been turned on, then the operation proceeds to step S103, while on the other hand, if the first switch SW1 is determined not to have been turned on, then the operation returns to step 101 where the display of the through image is continued until the first switch SW1 will be turned on.

In step S103, the camera controller unit 170 performs an initial driving in which the focus lens 213 is driven to a predetermined initial lens position. Note that the initial lens position in the initial driving may be, for example, but not particularly limited to, at one end of the camera body side or at the other end of the object side, or alternatively at a position to be determined depending on the shooting scene. Also note that, in step S103, the focus lens 213 may remain at the present position without performing an initial driving.

In step S104, the camera controller unit 170 performs to obtain maximum driving speed $V_{max\_lns}$, which is the maximum speed within the range of speed capable of driving the focus lens 213. More specifically, the camera controller unit 170 obtains from the lens controller unit 250 the maximum driving speed $V_{max\_lns}$ stored in the memory of the lens controller unit 250. Here, the obtained maximum driving speed $V_{max\_lns}$ is a speed based on an actual driving speed of the focus lens 213. In step S104, the camera controller unit 170 converts the maximum driving speed $V_{max\_lns}$) which is based on the actual driving speed of the focus lens 213, to a maximum driving speed $V_{max\_img}$, which is based on an image plane moving speed. More specifically, the camera controller unit 170 obtains from the lens controller unit 250 the maximum driving speed $V_{max\_lns}$ as well as lens information including an image plane moving coefficient ((image plane moving speed associated with driving of the focus lens 213)/(actual driving speed of the focus lens 213)). The camera controller unit 170 then converts, on the basis of the obtained lens information from the lens controller unit 250, the maximum driving speed $V_{max\_lns}$ for the focus lens 213 to the maximum driving speed $V_{max\_img}$ based on the image plane moving speed.

Thereafter, in step S105, the camera controller unit 170 performs a calculation for a first search speed $V_1$ in a first search operation. The first search operation herein is a sequence of processes for obtaining focus evaluation values at a plurality of image planes while driving the focus lens 213 in a predetermined range with the first search speed $V_1$ as will be described later, thereby to perform detection of the focus position on the basis of the obtained focus evaluation values. In addition, the first search speed $V_1$ is a speed based on the image plane moving speed for driving the focus lens 213 in the first search operation, and it may, for example, be set to a speed with which the focus position is detectable. For example, when the obtaining interval for the focus evaluation values capable of detecting the focus position is approximately 200 μm to 300 μm as an image plane moving amount and the time interval for calculating the focus evaluation values is 1/60 second, the first search speed $V_1$ of the first search operation may be calculated as being 300·60=18000 (m/sec)=18(mm/sec). The calculated first search speed $V_1$ in such a manner is transmitted to the lens controller unit 250 to be converted to the driving pulse signals, and the converted driving pulse signals are then transmitted to the focus lens driving motor 231 thereby to drive the focus lens 213 with the first search speed $V_1$ in the first search operation. Note that, there may be a case where the obtaining interval for the focus evaluation values capable of detecting the focus position comes to be large because the focus depth may increase as the aperture 220 is reduced in size, and in this case, the first search speed $V_1$ may be calculated as further increased speed.

In step S106, the camera controller unit 170 determines whether or not the relationship of the following equation (1) is satisfied on the basis of the obtained maximum driving speed $V_{max\_img}$ in step S104 and the calculated first search speed $V_1$ in step S105.

$$\text{Maximum driving speed } V_{max\_img} \cdot k1 \geq \text{First search speed } V_1 (0 < k1 \leq 1) \quad (1)$$

Here, k1 is a value which gives a condition where the maximum driving speed $V_{max\_img}$ may be determined as being a sufficiently fast speed compared to the first search speed $V_1$ if the maximum driving speed $V_{max\_img}$ and the first search speed $V_1$ satisfy the above equation (1), and may be set as being 0.8 to 0.9. If the maximum driving speed $V_{max\_img}$ for the focus lens 213 and the first search speed $V_1$ satisfy the above equation (1), then the operation proceeds to step S107, while on the other hand, if not satisfying, the operation proceeds to step S109.

In step S107, since the maximum driving speed $V_{max\_img}$ and the first search speed $V_1$ satisfy the above equation (1) and the maximum driving speed $V_{max\_img}$ is determined as being sufficiently faster than the first search speed $V_1$, the camera controller unit 170 performs a process for allowing a second search operation to be executed. The second search operation herein is to be performed subsequently to a first search operation in order to speedily search a second search range larger than the first search range when the focus position could not be detected within the first search range by the first search operation, and is thus a process for obtaining focus evaluation values at a plurality of image planes while driving the focus lens 213 in the second search range with a second search speed $V_2$ faster than the first search speed $V_1$ thereby to perform detection of the peak of the focus evaluation values on the basis of the obtained focus evaluation values. The second search speed $V_2$ is a speed based on the image plane moving speed for driving the focus lens 213 in the second search operation, and is set as being less than or equal to the maximum driving speed $V_{max\_img}$. In addition, the second search speed $V_2$ is enough to be a speed with which the presence of a peak of the focus evaluation values is detectable, and may not necessarily be required as being a speed with which the focus position is detectable. For example, the camera controller unit 170 may calculate the second search speed $V_2$ to be 50 to 100 (mm/sec). Thereafter, in step S108, the camera controller unit 170 restricts the search range, within which the first search operation is to be performed, to the first search range in order for the second search operation to be performed subsequently to the first search operation.

On the other hand, in step S106, if the maximum driving speed $V_{max\_img}$ for the focus lens 213 and the first search speed $V_1$ fail to satisfy the above equation (1), then the operation proceeds to step S109. In step S109, since the maximum driving speed $V_{max\_img}$ for the focus lens 213 and the first search speed $V_1$ fail to satisfy the above equation (1) thereby being determined to be of the comparable speed, the camera controller unit 170 performs a process to prohibit the second search operation from being executed. Thereafter, in step S110, the camera controller unit 170 sets the search range for the first search operation to be the entire range of the focus adjustable range without restricting to the first search range, because the second search operation is not to be performed subsequently to the first search operation.

In step S111, the camera controller unit 170 performs the first search operation. More specifically, the camera controller unit 170 obtains the focus evaluation values at a plurality of image planes while driving the focus lens 213 with the first search speed $V_1$ within the search range having been set at step S108 or step S110. Thereafter, the camera controller unit 170 detects the peak of the focus evaluation values on the basis of the obtained plurality of focus evaluation values. Note that the method of calculating the focus evaluation values is not particularly limited to, and the focus evaluation values may be calculated, for example, through receiving image signals from the image pickup device 110, processing the received signals with a high frequency filter, and accumulation processing the filtering processed image signals.

In step S112, the camera controller unit 170 determines whether or not the focus position has been detected in the first search operation. More specifically, when the peak of the focus evaluation values has been detected in the first search operation, the camera controller unit 170 determines the position of the detected peak of the focus evaluation values to be the focus position and also determines that the focus position has thus been detected. In step S112, if the focus position is determined to have been detected, then the operation proceeds to step S113, and a focusing driving is performed to drive the focus lens 213 to the detected focus position. On the other hand, in step S112, if the focus position is determined not to have been detected, then the operation proceeds to step S114.

In step S114, the camera controller unit 170 determines whether or not the first search operation has been performed within the entire range of the search range in the first search operation. Here, in step S108, if the search range in the first search operation has been restricted to the first search range, then the camera controller unit 170 determines whether or not the first search operation has been performed within the entire range of the first search range. On the other hand, if the search range in the first search operation has not been restricted to the first search range in step S110, then the camera controller unit 170 determines whether or not the first search operation has been performed within the entire range of the focus adjustable range which includes the first search range. If the first search operation has been performed within the entire range of the search range in the first search operation, then it is determined that the focus position could not been detected by the first search operation, and the operation proceeds to step S115 shown in FIG. 3. On the other hand, if the first search operation has not been performed within the entire range of the search range in the first search operation, then the operation returns to step S111, and the detection of the focus position continues to be performed within a search range which has not been completed with the first search operation.

In step S115 shown in FIG. 3, the camera controller unit 170 determines whether the second search is allowed for or not. More specifically, the camera controller unit 170 determines whether or not the second search operation has been allowed in step S107. If the second search operation is allowed, then the operation proceeds to step S116, while on the other hand, if the second search operation is not allowed, then the operation proceeds to step S122.

In step S116, the camera controller unit 170 performs the second search operation. More specifically, the camera controller unit 170 gives an instruction to the lens controller unit 250 to cause the focus lens 213 to be driven with the second search speed $V_2$. In response to the instruction from the camera controller unit 170, the lens controller unit 250 generates driving pulse signals for driving the focus lens 213 and transmits the generated driving pulse signals to the focus lens driving motor 231 thereby causing the focus lens 213 to be driven with the second search speed $V_2$. Thereafter, the camera controller unit 170 obtains focus evaluation values at a plurality of image planes while driving the focus lens 213 with the second search speed $V_2$ within the second search range and performs the detection of the peak of the focus evaluation values on the basis of the obtained plurality of focus evaluation values. Note that, since the second search speed $V_2$ is set as being less than or equal to the maximum driving speed $V_{max\_img}$, the camera controller unit 170 is able to cause the focus lens 213 to be driven with the second search speed $V_2$ in the second search operation by giving the instruction so as to cause the focus lens 213 to be driven with the second search speed $V_2$.

In step S117, the camera controller unit 170 determines whether or not the peak of the focus evaluation values has been detected in the second search operation. If the peak of the focus evaluation values is determined to have been detected, then the operation proceeds to step S119 in order to perform a third search operation subsequent to the second search operation, while on the other hand, if the peak of the focus evaluation values is determined not to have been detected, then the operation proceeds to step S118.

In step S118, it is determined whether or not the second search operation has been performed in the entire range of the second search range. If the second search operation has been performed in the entire range of the second search range, then it is considered that the peak of the focus evaluation values could not be detected by the second search operation, and the operation proceeds to step S122. On the other hand, if the second search operation has not been performed in the entire range of the second search range, then the operation returns to step S116, and the second search operation continues to be performed within a part of the second search range which has not completed performing the detection of focus evaluation values.

On the other hand, in step S117, if it is determined that the peak of the focus evaluation values has been detected, then the operation proceeds to step S119. In step S119, the camera controller unit 170 performs a third search operation. The third search operation is to be performed subsequently to the second search operation in order to detect the focus position in the vicinity of the position of the detected peak of the focus evaluation values in the second search operation when the peak of the focus evaluation values has been detected in the second search operation, and is thus a process for obtaining focus evaluation values at a plurality of image planes while driving the focus lens 213 in the third search range with a third search speed $V_3$ as will be described later thereby to perform detection of the peak of the focus evaluation values on the basis of the obtained focus evaluation values. In addition, the third search speed $V_3$ is a speed based on the image plane moving speed for driving the focus lens 213 in the third search operation, and may be selected as being a speed with which the focus position is detectable as similar to the first search speed $V_1$.

In step S120, the camera controller unit 170 determines whether or not the focus position has been detected within the third search range by the third search operation. More specifically, when the peak of the focus evaluation values could be detected in the third search operation, the camera controller unit 170 determines the detected peak of the focus evaluation values to be the focus position and also determines that the focus position has thus been detected. If it is determined that the focus position has been detected by the third search operation, then the operation proceeds to step S113 shown in FIG. 2, and a focusing driving is performed to drive the focus lens 213 to the detected focus position. On the other hand, if the focus position is determined not to have been detected by the third search operation, then the operation proceeds to step S121.

In step S121, the camera controller unit 170 determines whether or not the third search operation has been performed within the entire range of the third search range. If the third search operation has been performed within the entire range of the third search range, then it is considered that the focus position could not been detected by the third search operation, and the operation proceeds to step S122. On the other hand, if the third search operation has not been performed within the entire range of the third search range, then the operation returns to step S119, and the detection of the focus position continues to be performed within a part of the third search range in which the third search operation has not been performed.

On the other hand, if the second search operation is determined in step S115 as not being allowed, if the peak of the focus evaluation values is determined in step S118 as not having been detected by the second search operation, or, if the focus position is determined in step S121 as not having been detected by the third search operation, then the operation proceeds to step S122. In step S122, the camera controller unit 170 causes the focus lens 213 to be driven to a certain position, and the indication that the focus position could not be detected is presented on the transmissive-type liquid crystal display device 132 or the liquid crystal monitor 180, for example. Note that the certain position to which the focus lens 213 is to be driven in step S122 may be, for example, but not particularly limited to, a predetermined position, or the position where the focus evaluation value is maximum, or alternatively the present position may be still maintained. After completing step S122, the operation returns to step S101 shown in FIG. 2, and the above-described processes are repeated.

Figure 4:
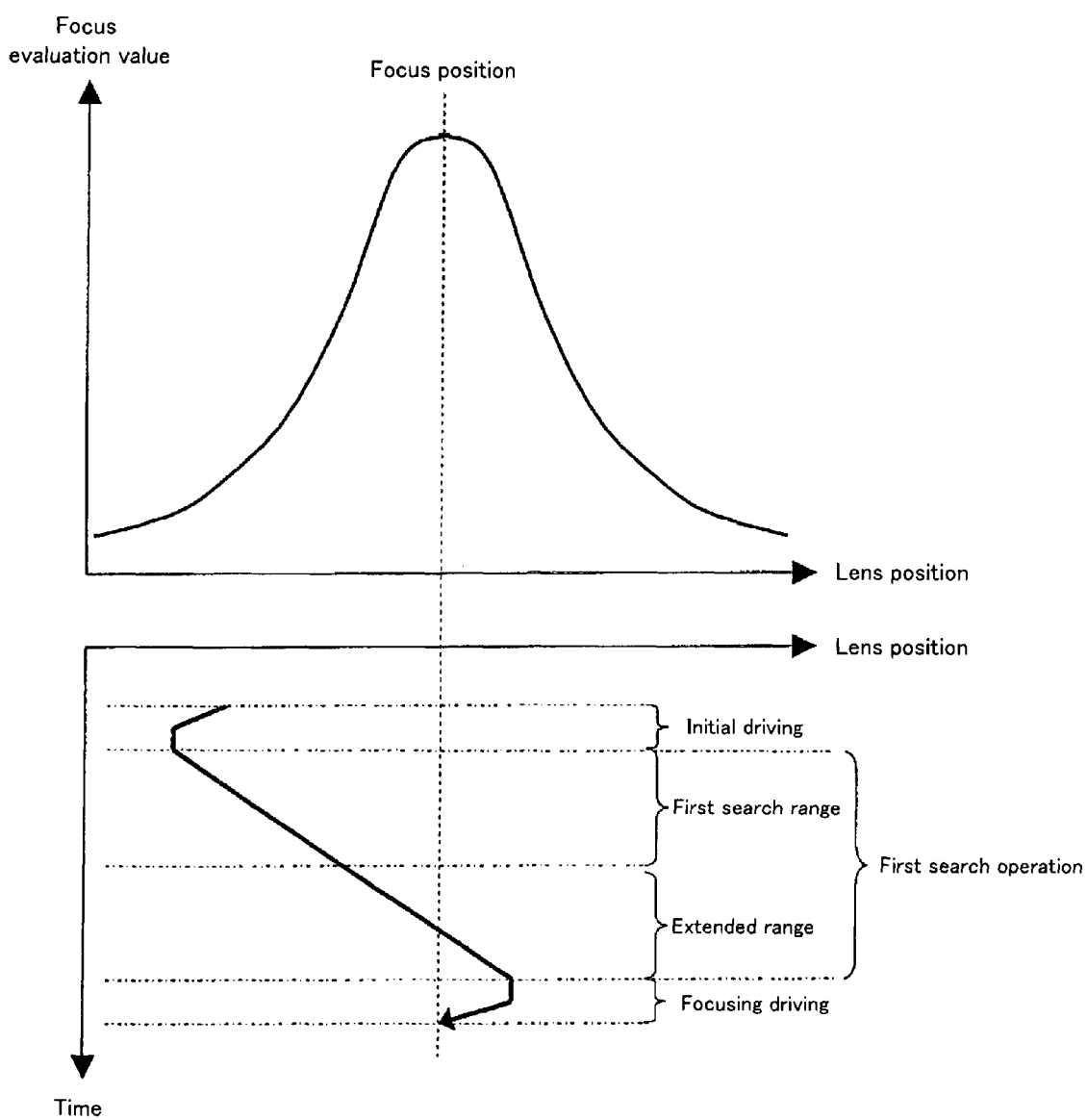
FIG. 4 is a graph for describing the operation of the camera 1 according to the first embodiment.
Figure 5:
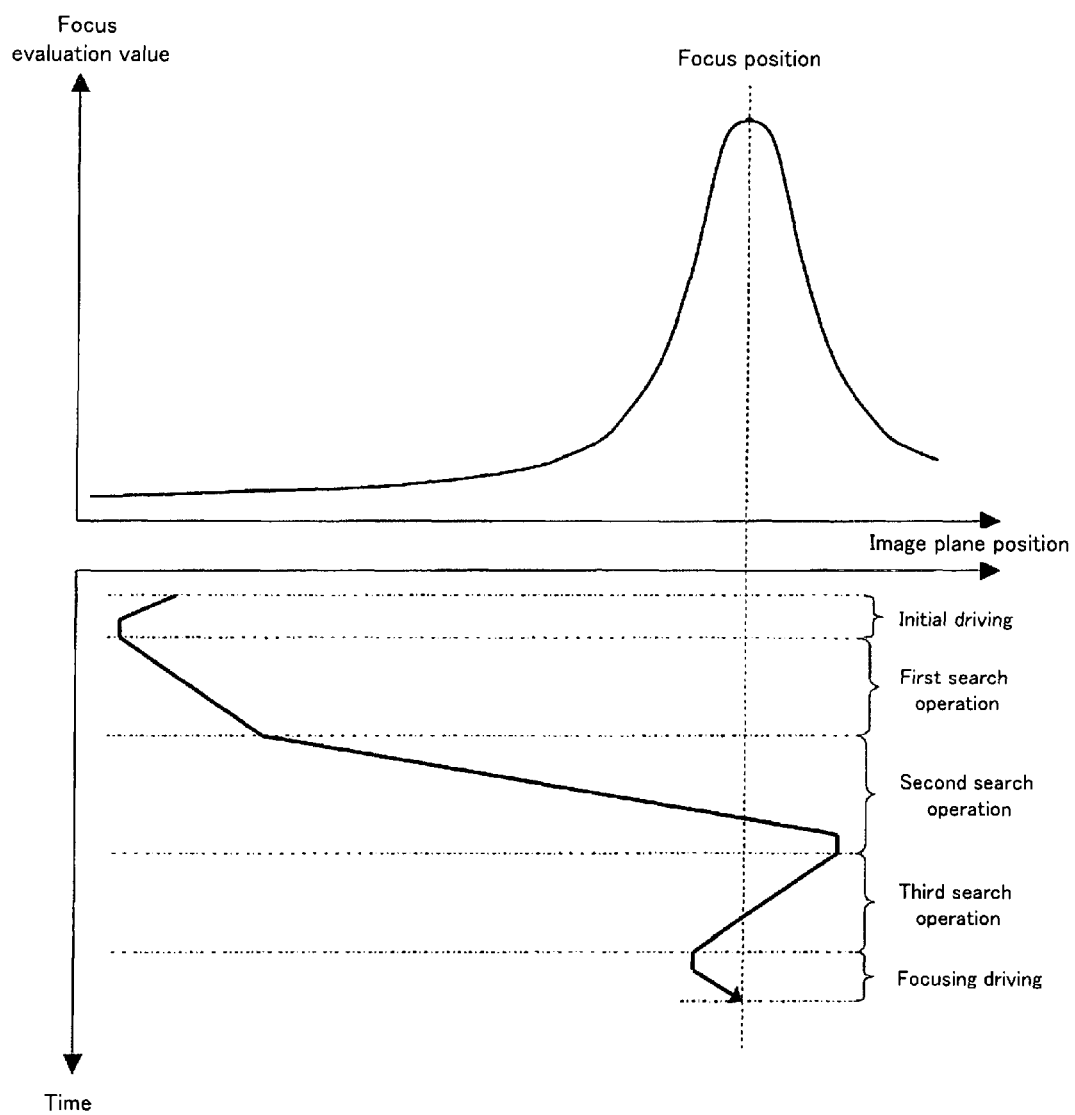
FIG. 5 is a graph for describing the operation of the camera 1 according to the first embodiment.

As described above, the camera 1 according to the first embodiment operates. Now, FIG. 4 and FIG. 5 are graphs for describing the operation of the camera 1 according to the present embodiment. The operation of the camera 1 according to the first embodiment will be further described with reference to FIG. 4 and FIG. 5 hereinafter.

At first the example shown in FIG. 4 will be described. In the example shown in FIG. 4, the scene is illustrated in which the second search operation is not performed subsequently to the first search operation, because the maximum driving speed $V_{max\_img}$ and the first search speed $V_1$ are of the comparable speed. In the example shown in FIG. 4, after performing the initial driving (step S103) at first, the first search operation is performed in a certain search range (step S111). Here, in the example shown in FIG. 4, the maximum driving speed $V_{max\_img}$ and the first search speed $V_1$ are of the comparable speed, and therefore the maximum driving speed $V_{max\_img}$ for the focus lens 213 and the first search speed $V_1$ fail to satisfy the relationship of the above equation (1), that is, the relationship: (Maximum driving speed $V_{max\_img}$)·k1≥ (First search speed $V_1$) (0<k1≤1) (step S106=NO). Consequently, in the example shown in FIG. 4, the second search operation subsequent to the first search operation is prohibited (step S109), and the search range in the first search operation is not restricted to the first search range (step S110) and is set across the entire range of the focus adjustable range. As a result, in the example shown in FIG. 4, the first search operation is performed within the extended search range including the first range (step S111). Therefore, in the example shown in FIG. 4, the focus position is detected by the first search operation (step S112=YES), and the focusing driving is performed to drive the focus lens 213 to the detected focus position (step S113).

Thus, the first embodiment is such that, when the maximum driving speed $V_{max\_img}$ and the first search speed $V_1$ are of the comparable speed, the second search operation subsequent to the first search operation is prohibited, and only the first search operation is performed across the entire range of the focus adjustable range. The conventional configuration has involved the following problem, in which the focus adjustable range of the optical system is determined as being relatively wide when the focal distance of the optical system is relatively large, and the second search operation is to be performed. That is, the problem of the conventional configuration is such that, even if the focus adjustable range is narrow and the maximum driving speed $V_{max\_img}$ and the first search speed $V_1$ are of the comparable speed, the second search operation and the third search operation are to be performed if the focal distance is determined to be large, and therefore the required time for focus detection will be long. In contrast, according to the first embodiment, as shown in FIG. 4, the second search operation is prohibited if the maximum driving speed $V_{max\_img}$ and the first search speed $V_1$ are of the comparable speed, and only the first search operation is performed thereby allowing the required time for focus detection to be reduced.

Then the example shown in FIG. 5 will be described. In the example shown in FIG. 5, the scene is illustrated in which the second search operation is performed subsequently to the first search operation, because the maximum driving speed $V_{max\_img}$ is a speed sufficiently faster than the first search speed $V_1$. In the example shown in FIG. 5, after performing the initial driving (step S103), the first search operation is performed in a certain search range (step S111). Here, in the example shown in FIG. 5, the maximum driving speed $V_{max\_img}$ is sufficiently faster than the first search speed $V_1$, and they thus satisfy the relationship of the above equation (1) (step S106=YES). Consequently, in the example shown in FIG. 5, the second search operation subsequent to the first search operation is allowed (step S107), and the search range in the first search operation is restricted to the first search range (step S108). Accordingly, in the example shown in FIG. 5, if the focus position has not been detected in the first search operation (step 114=YES), the second search operation is performed within the second search range larger than the first search range and with the second search speed $V_2$ sufficiently faster than the first search speed $V_1$ (step S116). Thus in the example shown in FIG. 5, the peak of the focus evaluation values has been detected in the second search operation (step S117=YES), and therefore the third search operation is performed subsequently to the second search operation (step S119) and the focusing driving is then performed to the detected focus position in the third search operation (step S113).

Thus, the first embodiment is such that, when the maximum driving speed $V_{max\_img}$ is sufficiently faster than the first search speed $V_1$, the second search operation subsequent to the first search operation is performed. The conventional configuration has involved the follow problem, in which the focus adjustable range of the optical system is determined as being relatively narrow when the focal distance of the optical system is relatively small, and only the first search operation is performed. That is, the problem of the conventional configuration is such that, even if the focus adjustable range is wide and the maximum driving speed $V_{max\_img}$ is sufficiently faster than the first search speed $V_1$, only the first search operation is to be performed if the focal distance is determined to be small, and therefore the required time for focus detection will be long. In contrast, according to the first embodiment, as shown in FIG. 5, the second search operation is performed subsequently to the first search operation if the maximum driving speed $V_{max\_img}$ is sufficiently faster than the first search speed $V_1$, and the second search operation subsequent to the first search operation is performed thereby allowing the required time for focus detection to be reduced.

Second Embodiment

Figure 6:
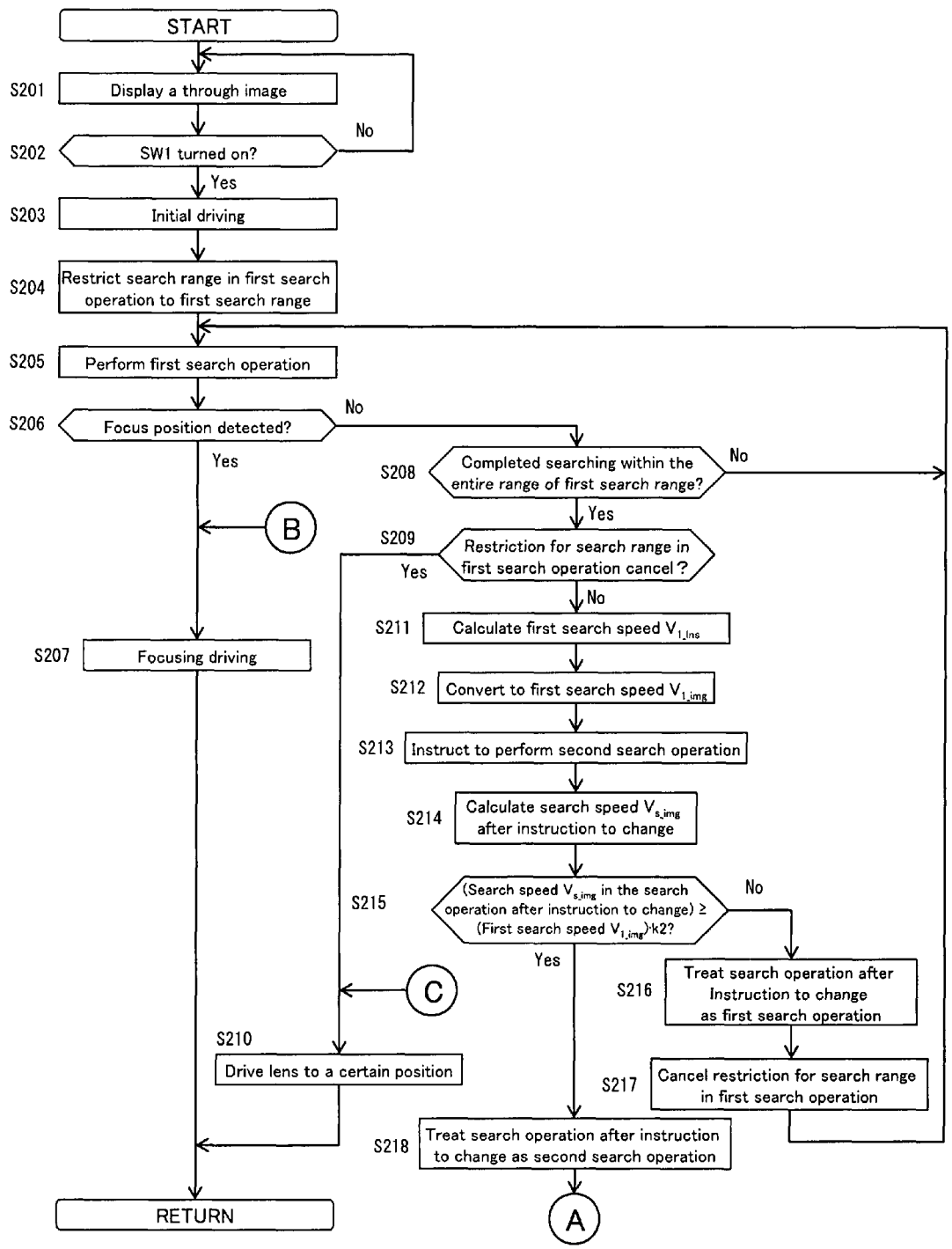
FIG. 6 is a flowchart (part 1) illustrating the operation of a camera 1 according to a second embodiment.
Figure 7:
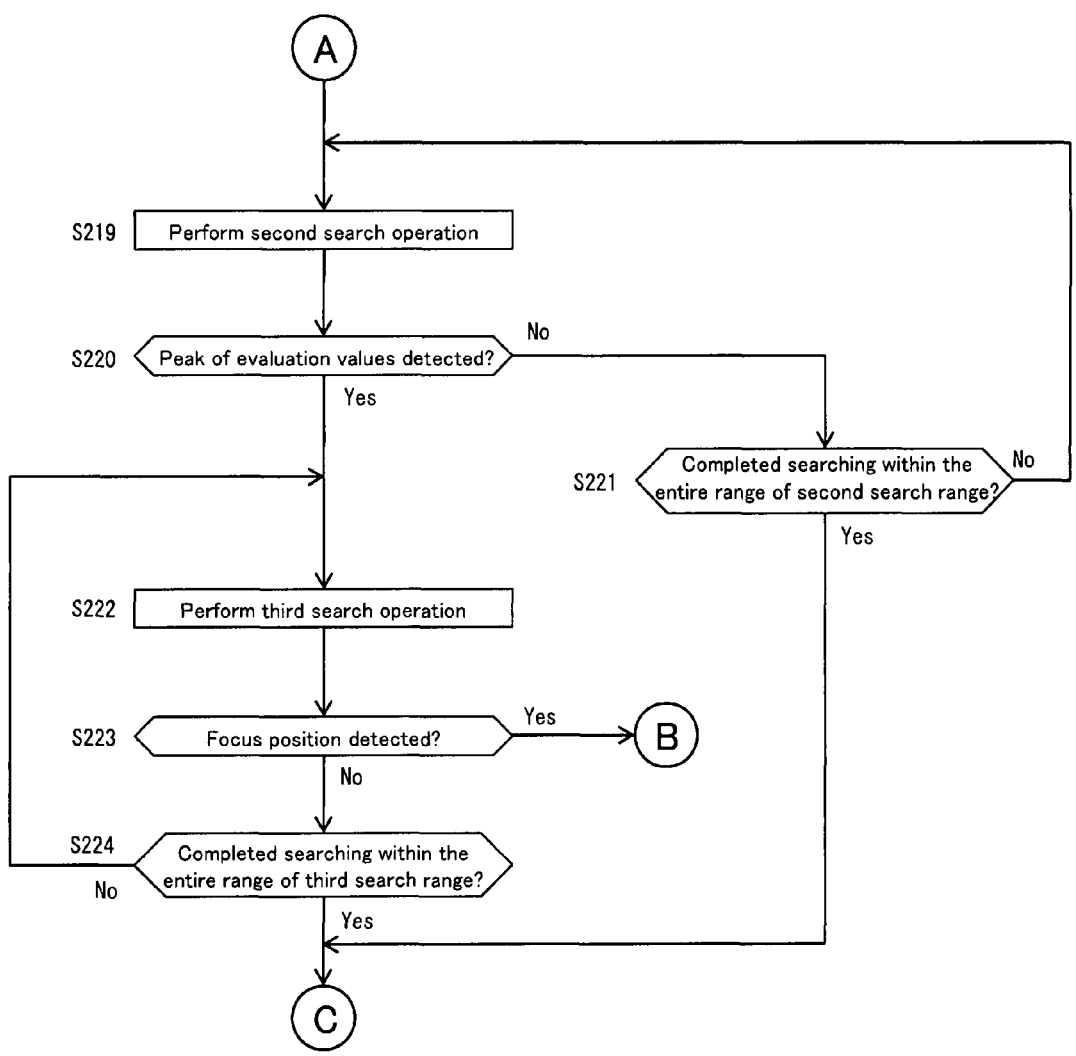
FIG. 7 is a flowchart (part 2) illustrating the operation of the camera 1 according to the second embodiment.

Then, the second embodiment according to the present invention will be described with reference to the drawings. The second embodiment is similar to the first embodiment excepting that the camera 1 shown in FIG. 1 operates as shown in FIG. 6 and FIG. 7. Hereinafter, the operation of the camera 1 according to the second embodiment will be described with reference to FIG. 6 and FIG. 7. Note that FIG. 6 and FIG. 7 are flowcharts illustrating the operation of the camera 1 according to the second embodiment.

At first in steps S201 to S203, similar to steps S101 to S103 in the first embodiment, the display of the through image is performed until the first switch SW1 will be turned on (steps S201 and S202), and the initial driving is performed to drive the focus lens 213 to a predetermined initial lens position when the first switch SW1 is turned on (step S203).

In step S204, the camera controller unit 170 sets a first search range as the search range in the first search operation. The first search operation herein is a sequence of processes for obtaining focus evaluation values at a plurality of image planes while driving the focus lens 213 in a predetermined range with the first search speed $V_{1\_img}$ as will be described later, thereby to perform detection of the focus position on the basis of the obtained focus evaluation values. In addition, the first search speed $V_{1\_img}$ is a speed based on the image plane moving speed at the time of having driven the focus lens 213 in the first search operation, and it would be set as being a speed with which the focus position could be detected.

Thereafter in step S205, the camera controller unit 170 performs the first search operation within the first search range having been set in step S204. More specifically, the camera controller unit 170 transmits an instruction for performing the first search operation and the first search speed $V_{1\_img}$ to the lens controller unit 250. The lens controller unit 250 calculates the driving speed for the focus lens 213 corresponding to the first search speed $V_{1\_img}$ on the basis of the received first search speed $V_{1\_img}$ from the camera controller unit 170, and generates driving pulse signals for driving the focus lens 213 on the basis of the calculated driving speed. Thereafter, the lens controller unit 250 transmits the generated driving pulse signals to the focus lens driving motor 231 thereby causing the focus lens 213 to be driven with the speed corresponding to the first search speed $V_{1\_img}$. Thus, the camera controller unit 170 obtains focus evaluation values at a plurality of image planes thereby to perform the detection of the focus position on the basis of the obtained focus evaluation values, while causing the focus lens 213 to be driven with the speed corresponding to the first search speed $V_{1\_img}$ within the first search range.

In step S206, the camera controller unit 170 determines whether or not the focus position has been detected within the first range by the first search operation. As similar to the first embodiment, when the peak of the focus evaluation values has been detected in the first search operation, the camera controller unit 170 determines the position of the detected peak of the focus evaluation values to be the focus position and also determines that the focus position has thus been detected. Thereafter, if the focus position is determined to have been detected, then the operation proceeds to step S207, and a focusing driving is performed to drive the focus lens 213 to the focus position. On the other hand, if the focus position is determined not to have been detected, then the operation proceeds to step S208.

In step S208, the camera controller unit 170 determines whether or not the first search operation has been performed within the entire range of the first search range. If the first search operation has not been performed within the entire range of the first search range, then the operation returns to step S205, and the first search operation continues to be performed within a search range which has not been completed with the first search operation. On the other hand, if the first search operation has been performed within the entire range of the first search range, then it is determined that the focus position could not been detected by the first search operation, and the operation proceeds to step S209.

In step S209, the camera controller unit 170 determines whether or not the restriction for the search range in the first search operation has been canceled in step S216 as will be described later. If the search range in the first search operation is determined not to be restricted to the first search range, then it is considered that the focus position could not be detected within the entire range of the focus adjustable range, and the operation proceeds to step S210, and thereafter the focus lens 213 is driven to a certain position and the indication that the focus position could not be detected is presented on the transmissive-type liquid crystal display device 132 or the liquid crystal monitor 180. On the other hand, if the search range in the first research operation is determined to be restricted to the first search range, then the operation proceeds to step S211.

In step S211, the camera controller unit 170 performs measurement of a first search speed $V_{1\_lns}$ in the first search operation. The first search speed $V_{1\_lns}$ herein is a speed based on the actual driving speed for the focus lens 213 at the time of having driven the focus lens 213 in the first search operation. The camera controller unit 170 according to the present embodiment obtains positional information regarding the focus lens 213 when performing the first search operation with a predetermined time interval from the encoder 261 for focus lens via the lens controller unit 250, and calculates the first search speed $V_{1\_lns}$ in the first search operation on the basis of the obtained positional information regarding the focus lens 213 with the predetermined time interval. Thereafter, in step S212, the camera controller unit 170 converts the first search speed $V_{1\_lns}$ based on the actual driving speed for the focus lens 213 to a first search speed $V_{1\_img}$ based on the image plane moving speed. More specifically, the camera controller unit 170 obtains lens information including an image plane moving coefficient from the lens controller unit 250, and converts, on the basis of the obtained lens information, the first search speed $V_{1\_lns}$ based on the actual driving speed for the focus lens 213 to the first search speed $V_{1\_img}$ based on the image plane moving speed.

In step S213, the camera controller unit 170 provides an instruction for performing the second search operation, because the focus position could not be detected by the first search operation. The second search operation herein is to be performed subsequently to the first search operation in order to speedily search a second search range larger than the first search range when the focus position could not be detected by the first search operation, and is thus a process for performing detection of the peak of the focus evaluation values while driving the focus lens 213 in the second search range with the speed based on a second search speed $V_{2\_img}$ sufficiently faster than the first search speed $V_{1\_img}$. In addition, the second search speed $V_{2\_img}$ is a speed based on the image plane moving speed at the time of having driven the focus lens 213 in the second search operation, and would be set as being sufficiently faster than the first search speed $V_{1\_img}$. Therefore, the second search speed $V_{2\_img}$ is usually to be a speed with which the focus position may not be detectable.

In step S214, the camera controller unit 170 calculates an actual search speed $V_{s\_img}$ after providing an instruction for performing the second search operation. Here, when the second search operation is instructed in step S213 to be performed, the focus lens driving motor 231 tries to drive the focus lens 213 with an instructed second search speed $V_{2\_lns}$ from the camera controller unit 170. However, the focus lens may not be driven with the second search speed $V_{2\_ns}$ in some cases, such as when the maximum driving speed for the focus lens 213 is a speed lower than the instructed second search speed $V_{2\_lns}$ from the camera controller unit 170. For this reason, in step S214, the camera controller unit 170 measures a search speed $V_{s\_lns}$ with which the focus lens 213 has been actually driven after the instruction for performing the second search operation. In addition, the camera controller unit 170 according to the second embodiment obtains, from the lens controller unit 250, lens information including the image plane moving coefficient in combination with the positional information regarding the focus lens 213. Thus, the camera controller unit 170 converts the search speed $V_{s\_img}$ based on the actual driving speed for the focus lens 213 to a search speed $V_{s\_img}$ based on the image plane moving speed, on the basis of the obtained lens information from the lens controller unit 250. Note that the search operation with the search speed $V_{s\_img}$ after providing the instruction for performing the second search operation will be described as being referred to as a "search operation after instruction to change", hereinafter.

In step S215, the camera controller unit 170 compares the first search speed $V_{1\_img}$ obtained in step S212 and the search speed $V_{s\_img}$ in the search operation after instruction to change obtained in step S214 with each other, and determines whether or not the first search speed $V_{1\_img}$ and the search speed $V_{s\_img}$ in the search operation after instruction to change satisfy the relationship of the following equation (2).

$$\text{Search speed } V_{s\_img} \text{ in the search operation after instruction to change} \geq \text{First search speed } V_{1\_img} \cdot k2 (k2 \geq 1) \quad (2)$$

Note that k2 is a value which gives a condition where the search speed $V_{s\_img}$ in the search operation after instruction to change may be determined as being a sufficiently fast speed compared to the first search speed $V_{1\_img}$ if the first search speed $V_{1\_img}$ and the search speed $V_{s\_img}$ in the search operation after instruction to change satisfy the relationship of the above equation (2), thereby also being a value which gives a condition where the search speed $V_{s\_img}$ in the search operation after instruction to change may be determined as being a speed with which the focus position is not detectable. If the first search speed $V_{1\_img}$ and the search speed $V_{s\_img}$ in the search operation after instruction to change are determined not to satisfy the above equation (2), then the operation proceeds to step S216, while on the other hand, if determined to satisfy, then the operation proceeds to step S218.

In step S216, since the first search speed $V_{1\_img}$ and the search speed $V_{s\_img}$ in the search operation after instruction to change are determined not to satisfy the relationship of the above equation (2), the camera controller unit 170 determines that the search operation after instruction to change is to perform the focus detection with a speed with which the focus position is detectable because the search speed $V_{s\_img}$ in the search operation after instruction to change is a speed equal to or a speed slightly faster than the first search speed $V_{1\_img}$ in the first search operation, and thus treats the search operation after instruction to change as the first search operation. That is, the camera controller unit 170 treats the search operation after instruction to change as a search operation for performing the focus detection with a speed with which the focus position is detectable. Thereafter, in step S217, since the search operation after instruction to change is treated as the first search operation and the first search operation is also to be performed within a search range outside the first search range, the search range in the first search operation, which has been restricted in step S204, is canceled and the search range in the first search operation is extended to a wider range than the first search range, for example to the entire range of the focus adjustable range. In step S217, after canceling the restriction for the search range in the first search operation, the operation returns to step S205, and the first search operation is performed within the search range outside the first search range.

On the other hand, in step S215, the first search speed $V_{1\_img}$ and the search speed in the search operation after instruction to change are determined to satisfy the relationship of the above equation (2), the operation proceeds to step S218. In step S218, since the first search speed $V_{1\_img}$ and the search speed $V_{s\_img}$ in the search operation after instruction to change are determined to satisfy the relationship of the above equation (2), the camera controller unit 170 determines that the search operation after instruction to change is to perform the focus detection with a speed with which the focus position is not detectable because the search speed $V_{s\_img}$ in the search operation after instruction to change is a speed sufficiently faster than the first search speed $V_{1\_img}$ in the first search operation, and thus treats the search operation after instruction to change as the second search operation. That is, the camera controller unit 170 treats the search operation after instruction to change as a search operation for performing the focus detection with a speed with which the focus position is not detectable.

In step S219 shown in FIG. 7, the search operation after instruction to change is determined to perform the focus detection with a speed with which the focus position is not detectable and the search operation after instruction to change is treated as the second search operation, and the camera controller unit 170 thus performs the second search operation within the second search range. More specifically, the camera controller unit 170 gives an instruction to the lens controller unit 250 to cause the focus lens 213 to be driven with the second search speed $V_{2\_img}$. In response to the instruction from the camera controller unit 170, the lens controller unit 250 generates driving pulse signals for driving the focus lens 213 and transmits the generated driving pulse signals to the focus lens driving motor 231 thereby causing the focus lens 213 to be driven with the second search speed $V_{2\_img}$. Thereafter, the camera controller unit 170 obtains focus evaluation values at a plurality of image planes while driving the focus lens 213 with the second search speed $V_{2\_img}$ within the second search range and performs the detection of the peak of the focus evaluation values on the basis of the obtained focus evaluation values.

In steps S220 to S224, similar process as steps S117 to S121 in the first embodiment are performed. That is, if the peak of the focus evaluation values has been detected in the second search operation (step S220=YES), then an instruction is provided to perform the third search operation wherein a certain search range including the detected peak of the focus evaluation values is searched with a speed with which the focus position is detectable, and the third search is performed (step S222). If the focus position has been detected in the third search operation (step S223=YES), then a focusing driving is performed to drive the focus lens 213 to the detected focus position (step S207). On the other hand, if the peak of the focus evaluation values could not been detected in the second search operation (step S221=YES), and also if the focus position could not been detected in the third search operation (step S224=YES), then the focus lens 213 is driven to a certain position and the indication that the focus position could not be detected is presented on the transmissive-type liquid crystal display device 132 or the liquid crystal monitor 180, for example (step S210).

Figure 8:
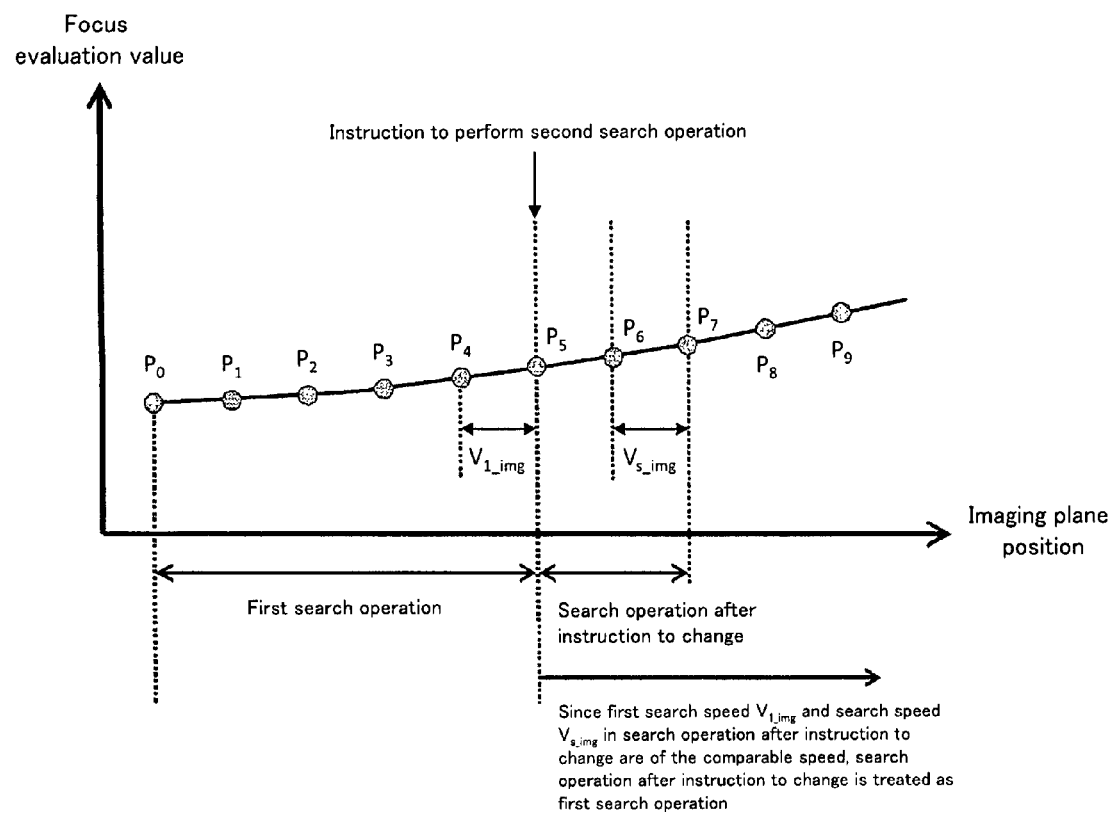
FIG. 8 is a graph for describing the operation of the camera 1 according to the second embodiment.
Figure 9:
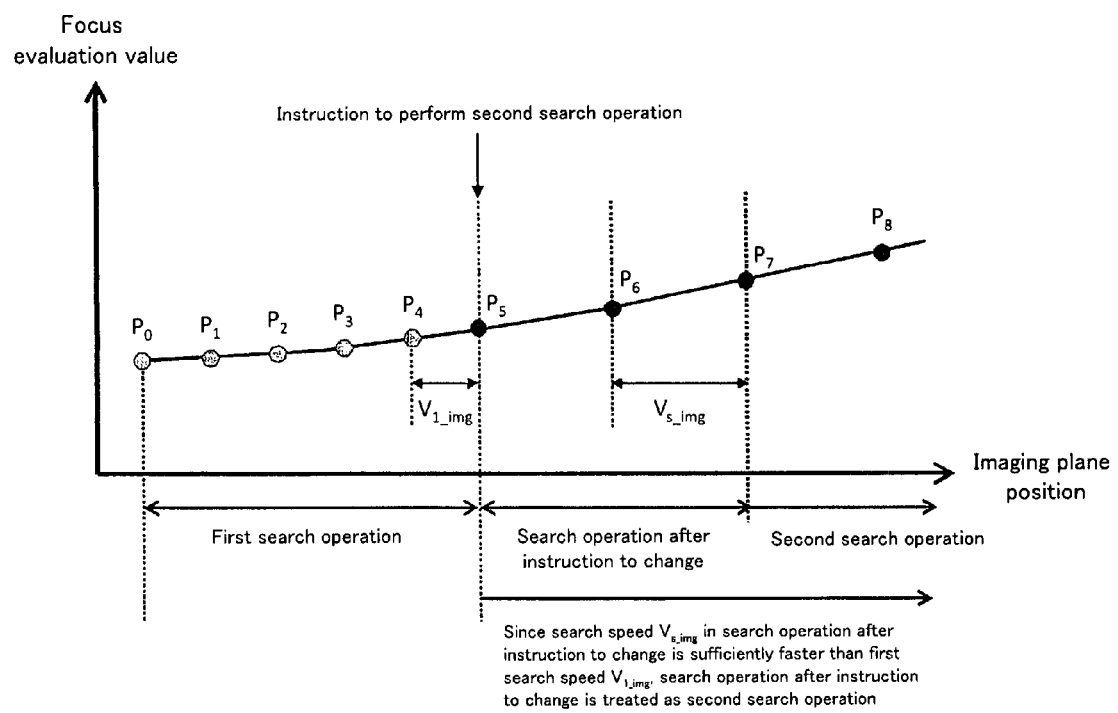
FIG. 9 is a graph for describing the operation of the camera 1 according to the second embodiment.

As described above, the camera 1 according to the second embodiment operates. Now, FIG. 8 and FIG. 9 are graphs for describing the operation of the camera 1 according to the second embodiment. The operation of the camera 1 according to the second embodiment will be further described with reference to FIG. 8 and FIG. 9 hereinafter.

At first the example shown in FIG. 8 will be described. In the example shown in FIG. 8, the scene example is illustrated in which the first search speed $V_{1\_img}$ and the search speed $V_{s\_img}$ in the search operation after instruction to change are of the comparable speed, and the search operation after instruction to change is treated as the first search operation. In the example shown in FIG. 8, the first search operation is performed from the image plane position $P_0$ (step S205). More specifically, focus evaluation values are obtained at a plurality of different image planes (image plane positions $P_0$, $P_1$, $P_2$, $P_3$, $P_4$, and $P_5$) while driving the focus lens 213, and the detection of the focus position at which any focus evaluation value takes the peak is performed on the basis of the obtained focus evaluation values. As shown in FIG. 8, the focus position may not be detected by the first search operation within the first search range from the image plane position $P_0$ to the image plane position $P_5$ in the example shown in FIG. 8 (step S208=YES), and therefore, positional information regarding the focus lens 213 at the image plane position $P_4$ and positional information regarding the focus lens 213 at the image plane position $P_5$ are obtained from the encoder 261 for focus lens via the lens controller unit 250, and the first search speed $V_{1\_img}$ in the first search operation is calculated (step S211). In addition, since the focus position could not be detected by the first search operation, an instruction is provided to perform the second search operation subsequent to the first search operation (step S213). This allows the focus lens 213 to be driven in the example shown in FIG. 8, and the search operation after instruction to change is performed from the image plane position $P_5$ to the image plane position $P_7$. In the example shown in FIG. 8, positional information regarding the focus lens 213 at the image plane position $P_6$ and positional information regarding the focus lens 213 at the image plane position $P_7$ are obtained from the encoder 261 for focus lens via the lens controller unit 250 (step S211), and the search speed $V_{s\_img}$ in the search operation after instruction to change is calculated (step S212). Thereafter, the camera controller unit 170 determines whether the first search speed $V_{1\_img}$ and the search speed $V_{s\_img}$ in the search operation after instruction to change satisfy the relationship of the above equation (2), that is, the relationship: (Search speed $V_{s\_img}$ in the search operation after instruction to change)≥ (First search speed $V_{1\_img}$·k2) (k1>1) (step S215). In the example shown in FIG. 8, it is determined that the relationship of the above equation (2) fails to be satisfied because the first search speed $V_{1\_img}$ and the search speed $V_{s\_img}$ in the search operation after instruction to change are of the comparable speed (step S215=NO). Consequently, the search operation after instruction to change is determined to perform the focus detection with a speed with which the focus position is detectable, thereby being treated as the first search operation (step S216). Thereafter, in the example shown in FIG. 8, the search range in the first search operation is extended (step S217), and the first search operation is to be performed within the extended search range.

Then, the example shown in FIG. 9 will be described. In the example shown in FIG. 9, the scene is illustrated in which the search speed $V_{s\_img}$ in the search operation after instruction to change is sufficiently faster than the first search speed $V_{1\_img}$, and the search operation after instruction to change is treated as the second search operation. In the example shown in FIG. 9, as similar to the example shown in FIG. 8, the focus position may not be detected by the first search operation within the first search range from the image plane position $P_0$ to the image plane position $P_5$ (step S208=YES), and therefore, an instructions is provided to perform the second search operation subsequent to the first search operation (step S213). In the example shown in FIG. 9, it is determined that the relationship of the above equation (2) is satisfied because the search speed $V_{s\_img}$ in the search operation after instruction to change is sufficiently faster than the first search speed $V_{1\_img}$, (step S215=YES). Consequently, the search operation after instruction to change is determined to perform the focus detection with a speed with which the focus position is not detectable, thereby being treated as the second search operation (step S218). For this reason, in the example shown in FIG. 9, the second search operation is to be performed subsequently to the first search operation. Note that, in the examples shown in FIG. 8 and FIG. 9, speeds at the image plane position $P_6$ to the image plane position $P_7$ are calculated without calculating those at the image plane position $P_5$ to the image plane position $P_6$ when calculating the search speed $V_{s\_img}$ in the search operation after instruction to change. This is due to that the speeds at the image plane position $P_6$ to the image plane position $P_7$ are not immediately after the driving speed of the focus lens has been changed by the instruction to perform the second search operation, and stable search speed $V_{s\_img}$ in the search operation after instruction to change may be obtained.

Thus, according to the second embodiment, the first search speed $V_{1\_img}$ in the first search operation and the search speed $V_{s\_img}$ in the search operation after instruction to change are compared with each other, and if it is determined that the first search speed $V_{1\_img}$ and the search speed $V_{s\_img}$ in the search operation after instruction to change are of the comparable speed, then the search operation after instruction to change is determined to perform the focus detection with a speed with which the focus position is detectable, thereby being treated as the first search operation, and even after instruction for the second search operation, only the first search operation is thus performed without performing the second search operation. On the other hand, if the search speed $V_{s\_img}$ in the search operation after instruction to change is determined to be sufficiently faster than the first search speed $V_{1\_img}$, then the search operation after instruction to change is determined to perform the focus detection with a speed with which the focus position is not detectable, thereby being treated as the second search operation, and the second search operation is performed subsequently to the first search operation after instruction for the second search operation. Thus, according to the second embodiment, even if the maximum driving speed $V_{max\_lns}$ for the focus lens 213 may not be obtained, it is possible to determine whether the search speed $V_{s\_img}$ in the search operation after instruction to change is the first search speed $V_{1\_img}$ or the second search speed $V_{2\_img}$, and when the focus position could not be detected by the first search operation within the first search range, the focus detection may be further efficiently performed by determining, based on that result of the determination, whether performing the detection of the focus position still in the first search operation or performing the second search operation where the focus position is detected with a speed faster than that of the first search operation.

It is to be noted that the embodiments as explained above are described to facilitate understanding of the present invention and are not described to limit the present invention. Therefore, it is intended that the elements disclosed in the above embodiments include all design changes and equivalents to fall within the technical scope of the present invention.

For example, although the first embodiment described above is such that the maximum driving speed $V_{max\_img}$ based on the image plane moving speed and the first search speed $V_1$ based on the image plane moving speed are compared with each other by converting the maximum driving speed $V_{max\_lns}$ based on the driving speed for the focus lens 213 to the maximum driving speed $V_{max\_img}$ based on the image plane moving speed, the present invention is not particularly limited to this configuration, and it may be possible to configure, for example, such that the maximum driving speed $V_{max\_lns}$ based on the driving speed for the focus lens 213 and the first search speed based on the driving speed for the focus lens 213 are compared with each other by converting the first search speed $V_1$ based on the image plane moving speed to the first search speed based on the driving speed for the focus lens 213.

Moreover, the above described first embodiment may be configured such that step S106 to step S110 are performed after step S111. That is, the configuration may be employed in which, by actually measuring the first search speed $V_1$ while performing the first search operation in step S111, the maximum driving speed $V_{max\_img}$ and the measured first search speed are compared with each other thereby to determine whether or not allowing the second search operation.

Furthermore, although the camera 1 according to the above described embodiments comprises the phase difference type AF detecting module 160, the present invention is not limited to this configuration, and another configuration without the phase difference type AF detecting module 160 may also be employed.

It is also to be noted that the camera 1 according to the present embodiment is not particularly limited, and the present invention may be applied to digital video cameras, single-lens reflex digital cameras, built-in lens type digital cameras, cameras for mobile phones, and other optical devices.

What is claimed is:

1. A focus adjustment device comprising:
a driver that drives a focus adjustment optical system to change a focus status of an optical system;
a focus detector that detects evaluation values with respect to contrast of images by the optical system in a plurality of different focus statuses to perform focus detection for the optical system;
an obtaining unit that obtains a maximum driving speed among speeds with which the focus adjustment optical system is able to be driven; and
a controller that causes the driver to perform a first driving operation in which the focus adjustment optical system is driven within a certain range and with a certain speed or to perform a second driving operation which is different from the first driving operation,
wherein:
the controller compares the maximum driving speed and a first driving speed as a driving speed for the focus adjustment optical system during the first driving operation with each other when a peak of the evaluation values fails to be detected within the certain range as a result of performing the first driving operation, and determines based on obtained comparison result whether or not to cause the driver to perform the second driving operation subsequently to the first driving operation, and
the controller causes the driver to perform the second driving operation subsequently to the first driving operation when a peak of the evaluation values fails to be detected within the certain range as a result of performing the first driving operation and when the maximum driving speed and the first driving speed satisfy a relationship: (the maximum driving speed)·k1≥(the first driving speed), wherein (0<k1≤1).

2. The focus adjustment device as set forth in claim 1, wherein
the first driving operation and the second driving operation are different from each other in a driving speed for the focus adjustment optical system and in a driving range for the focus adjustment optical system.

3. The focus adjustment device as set forth in claim 2, wherein
a second driving speed as a driving speed for the focus adjustment optical system during the second driving operation is a speed faster than the first driving speed during the first driving operation.

4. The focus adjustment device as set forth in claim 1, wherein
the controller causes the driver to perform the first driving operation after extending a driving range when having determined not to cause the second driving operation to be performed.

5. The focus adjustment device as set forth in claim 1, wherein
the controller causes the driver to perform a third driving operation different from the second driving operation subsequently to the second driving operation when having determined to cause the second driving operation to be performed.

6. A focus adjustment device comprising:
a driver that drives a focus adjustment optical system to change a focus status of an optical system;
a focus detector that detects evaluation values with respect to contrast of images by the optical system in a plurality of different focus statuses to perform focus detection for the optical system;
a controller that instructs the driver to change a driving speed for the focus adjustment optical system to a faster speed than a present driving speed when the focus detector fails to detect a peak of the evaluation values within a certain range; and
a determining unit that compares, when the controller provides an instruction to change the driving speed for the focus adjustment optical system, a before-instruction driving speed as the driving speed for the focus adjustment optical system before the instruction to change and an after-instruction driving speed as the driving speed for the focus adjustment optical system after the instruction to change with each other, and determines based on obtained comparison result whether or not the after-instruction driving speed is a speed with which a focus position is detectable.

7. The focus adjustment device as set forth in claim 6, wherein
the determining unit determines that the after-instruction driving speed is a speed with which the focus position is not detectable when the before-instruction driving speed and the after-instruction driving speed satisfy a relationship: (the after-instruction driving speed)≥(the before-instruction driving speed)·k2, wherein (k2≥1).

8. The focus adjustment device as set forth in claim 6, wherein
the controller instructs the driver to change the driving speed for the focus adjustment optical system to a speed with which the focus position is detectable after causing the focus detection for the optical system to be performed with the after-instruction driving speed when the after-instruction driving speed is determined to be a speed with which the focus position is not detectable.

9. An imaging device comprising the focus adjustment device as set forth in claim 1.

10. An imaging device comprising:
the focus adjustment device as set forth in claim 1; and
a lens barrel having the focus adjustment optical system,
wherein the obtaining unit obtains the maximum driving speed from the lens barrel.

11. A focus adjustment device comprising:
a driver that drives a focus adjustment optical system to change a focus status of an optical system;
a focus detector that detects evaluation values with respect to contrast of images by the optical system in a plurality of different focus statuses to perform focus detection for the optical system;
an obtaining unit that obtains a maximum driving speed among speeds with which the focus adjustment optical system is able to be driven; and
a controller that causes the driver to perform at least one of a first driving operation in which the focus adjustment optical system is driven within a certain range and with a certain speed and a second driving operation which is different from the first driving operation,
wherein:
the controller compares a reference speed which is less than or equal to the maximum driving speed and a first driving speed as a driving speed for the focus adjustment optical system during the first driving operation with each other when a peak of the evaluation values fails to be detected within the certain range as a result of performing the first driving operation, and
the controller causes the driver to perform the second driving operation if the reference speed is faster than or equal to the first driving speed and causes the driver not to perform the second driving operation if the reference speed is less than the first driving speed.

* * * * *